(12) United States Patent
Humbard

(10) Patent No.: US 8,952,806 B2
(45) Date of Patent: Feb. 10, 2015

(54) METHOD AND SYSTEM FOR REMOTELY MONITORING A USER

(71) Applicant: Resource Consortium Limited, Tortola (VG)

(72) Inventor: Charles Humbard, Peachtree City, GA (US)

(73) Assignee: Resource Consortium Limited (VG)

( * ) Notice: Subject to any disclaimer, the term of this patent is extended or adjusted under 35 U.S.C. 154(b) by 0 days.

(21) Appl. No.: 14/022,612

(22) Filed: Sep. 10, 2013

(65) Prior Publication Data

US 2014/0009283 A1 Jan. 9, 2014

Related U.S. Application Data

(63) Continuation of application No. 13/585,279, filed on Aug. 14, 2012, now Pat. No. 8,531,302, which is a continuation of application No. 13/313,398, filed on Dec. 7, 2011, now abandoned, which is a continuation (Continued)

(51) Int. Cl.

| | |
|---|---|
| *G08B 1/08* | (2006.01) |
| *G08B 21/02* | (2006.01) |
| *G08B 21/04* | (2006.01) |
| *G08B 21/08* | (2006.01) |
| *G08B 21/22* | (2006.01) |

(52) U.S. Cl.
CPC .............. *G08B 21/02* (2013.01); *G08B 21/0202* (2013.01); *G08B 21/04* (2013.01); *G08B 21/0453* (2013.01); *G08B 21/088* (2013.01); *G08B 21/22* (2013.01)
USPC ................. 340/539.12; 340/573.1; 340/539.1; 340/539.11

(58) Field of Classification Search
CPC .............. G08B 21/0202; G08B 21/04; G08B 21/0453; G08B 21/088; G08B 21/22; G08B 21/02
USPC .................. 340/539.12, 573.1, 573.4, 539.1, 340/539.11, 539.13, 500, 540, 10.1, 693.5, 340/691.1; 600/300, 301; 128/903
See application file for complete search history.

(56) References Cited

U.S. PATENT DOCUMENTS

| | | |
|---|---|---|
| 4,593,273 A | 6/1986 | Narcisse |
| 4,785,291 A | 11/1988 | Hawthorne |
| 4,899,135 A | 2/1990 | Ghahariiran |

(Continued)

OTHER PUBLICATIONS www.WherifyWireless.com, "Frquently Askes Questions", pp. 1-7, Jul. 22, 2003.

(Continued)

*Primary Examiner* — Anh V La
(74) *Attorney, Agent, or Firm* — The Belles Group, P.C.

(57) ABSTRACT

A subscription system and corresponding method of operation for monitoring user's well-being is disclosed. The method includes the steps of providing, at a user monitor module, a first indicator for the user well-being; providing, at a receiving module operably coupled to the user monitor module, a first threshold for the first indicator; receiving, at the receiving module, the first indication; comparing the first indication and the first threshold; generating a secondary indication when the comparison indicates that the first indication equals or exceeds the first threshold; receiving, at a supervisory module coupled to the receiver module, the secondary indication; and informing a supervisor that the first threshold has been reached.

20 Claims, 13 Drawing Sheets

Related U.S. Application Data of application No. 12/643,592, filed on Dec. 21, 2009, which is a continuation of application No. 11/976,647, filed on Oct. 26, 2007, now Pat. No. 7,659,826, which is a continuation of application No. 10/992,003, filed on Nov. 19, 2004, now Pat. No. 7,312,710, which is a continuation of application No. 10/140,064, filed on May 8, 2002, now Pat. No. 6,825,767.

(56) References Cited

U.S. PATENT DOCUMENTS

| | | |
|---|---|---|
| 5,119,072 A | 6/1992 | Hemingway |
| 5,289,163 A | 2/1994 | Perez et al. |
| 5,337,041 A | 8/1994 | Friedman |
| 5,528,222 A | 6/1996 | Moskowitz et al. |
| 5,646,593 A | 7/1997 | Hughes et al. |
| 5,661,460 A | 8/1997 | Sallen et al. |
| 5,689,240 A | 11/1997 | Traxler |
| 5,712,619 A | 1/1998 | Simkin |
| 5,731,757 A | 3/1998 | Layson, Jr. |
| 5,771,001 A | 6/1998 | Cobb |
| 5,812,056 A | 9/1998 | Law |
| 5,841,352 A | 11/1998 | Prakash |
| 5,900,817 A | 5/1999 | Olmassakian |
| 5,905,461 A | 5/1999 | Neher |
| 6,014,080 A | 1/2000 | Layson, Jr. |
| 6,084,517 A | 7/2000 | Rabanne et al. |
| 6,100,806 A | 8/2000 | Gaukel |
| 6,127,931 A | 10/2000 | Mohr |
| 6,172,640 B1 | 1/2001 | Durst et al. |
| 6,198,394 B1 * | 3/2001 | Jacobsen et al. ........... 340/573.1 |
| 6,236,358 B1 | 5/2001 | Durst et al. |
| 6,243,572 B1 | 6/2001 | Chow et al. |
| 6,278,370 B1 | 8/2001 | Underwood |
| 6,304,186 B1 | 10/2001 | Rabanne et al. |
| 6,326,891 B1 | 12/2001 | Lin |
| 6,333,694 B2 | 12/2001 | Pierce et al. |
| 6,362,778 B2 | 3/2002 | Neher |
| 6,388,612 B1 | 5/2002 | Neher |
| 6,396,403 B1 | 5/2002 | Haner |
| 6,402,691 B1 | 6/2002 | Peddicord et al. |
| 6,421,001 B1 | 7/2002 | Durst et al. |
| 6,459,913 B2 | 10/2002 | Cloutier |
| 6,518,889 B2 * | 2/2003 | Schlager et al. ........... 340/573.1 |
| 6,540,674 B2 * | 4/2003 | Zadrozny et al. ............. 600/300 |
| 6,559,769 B2 | 5/2003 | Anthony et al. |
| 6,665,613 B2 | 12/2003 | Duvall |
| 6,762,684 B1 | 7/2004 | Camhi |
| 6,825,767 B2 | 11/2004 | Humbard |
| 6,961,001 B1 | 11/2005 | Chang et al. |
| 7,312,710 B2 | 12/2007 | Humbard |
| 7,659,826 B2 | 2/2010 | Humbard |
| 8,531,302 B2 | 9/2013 | Humbard |
| 2003/0107487 A1 * | 6/2003 | Korman et al. ........... 340/573.1 |
| 2003/0163287 A1 | 8/2003 | Vock et al. |

OTHER PUBLICATIONS www.WherifyWireless.com, "News Video", pp. 1-4, Jul. 22, 2002.
www.WherifyWireless.com, "About Us", pp. 1-4, Jul. 22, 2002.
www.WherifyWireless.com, "GPS Personal Locator for Children", pp. 1-3, Jul. 22, 2002.

* cited by examiner

METHOD AND SYSTEM FOR REMOTELY MONITORING A USER

CROSS REFERENCE TO RELATED APPLICATIONS

This patent application is a Continuation of U.S. patent application Ser. No. 13/585,279, filed Aug. 14, 2012, which is a Continuation of U.S. patent application Ser. No. 13/313, 398, filed Dec. 7, 2011 (now abandoned), which is a Continuation of U.S. patent application Ser. No. 12/643,592, filed Dec. 21, 2009 (now abandoned), which is a Continuation of U.S. patent application Ser. No. 11/976,647, filed Oct. 26, 2007 (now U.S. Pat. No. 7,659,826); which is a Continuation of U.S. patent application Ser. No. 10/992,003, filed Nov. 19, 2004 (now U.S. Pat. No. 7,312,710); which is a Continuation of U.S. patent application Ser. No. 10/140,064, filed May 8, 2002 (now U.S. Pat. No. 6,825,767), the entire disclosures of which are herein incorporated by reference.

TECHNICAL FIELD

The technical field includes systems and methods for monitoring user well-being, and more specifically monitoring user status on a remote basis.

BACKGROUND

It is often necessary to monitor the well-being of others. For example, because they lack the mature judgment and experience of adults, it is generally desirable to be able to monitor the well-being of children. Similarly, it may be desirable to monitor the well-being of adults who are physically or mentally infirm and, therefore, lack the wherewithal to protect themselves from harm. However, it is often difficult or impossible to monitor the well-being of others on a personal and direct basis for an extended period of time.

Monitoring on a remote basis allows a supervisor to monitor the well-being of others while minimizing the time and effort required. Remote monitoring allows the supervisor to attend to other activities or tasks while maintaining awareness of those to be monitored. Additionally, monitoring provides a supplemental means for monitoring when monitoring is conducted primarily on a personal and direct basis.

However, the current systems and methods for remote monitoring are not multifunctional in application.

SUMMARY

What is disclosed is a method for monitoring user well-being. The method includes the steps of providing, at a user monitor module, a first indicator for the user well-being; providing, at a receiving module operably coupled to the user monitor module, a first threshold for the first indicator; receiving, at the receiving module, first indication; comparing the first indication and the first threshold; generating a secondary indication when the comparison indicates that the first indication equals or exceeds the first threshold; receiving, at a supervisory module coupled to the receiver module, the secondary indication; and informing a supervisor that the first threshold has been reached.

Also disclosed is method for providing a subscription system that monitors user well-being. The method includes the steps of receiving from a user; a request to implement the subscription service; receiving from the user, user profile information; creating a user profile based on the user profile information; receiving a user-selected set of monitoring options; and activating user well-being monitoring based on the user-selected monitoring options.

Further, what is disclosed is a subscription system that monitors user well-being including a subscription module operably coupled to a receiver module and a supervisory module. The subscription module includes means for allowing interactions with one or more customers; means for allowing the one or mere customers to select subscription services; means for creating, storing, and updating user profiles; and means for protecting privacy of data used in the user profiles.

DESCRIPTION OF THE DRAWINGS

The detailed description will refer to the following drawings, wherein like numerals refer to like elements, and wherein.

DETAILED DESCRIPTION

Figure 1:
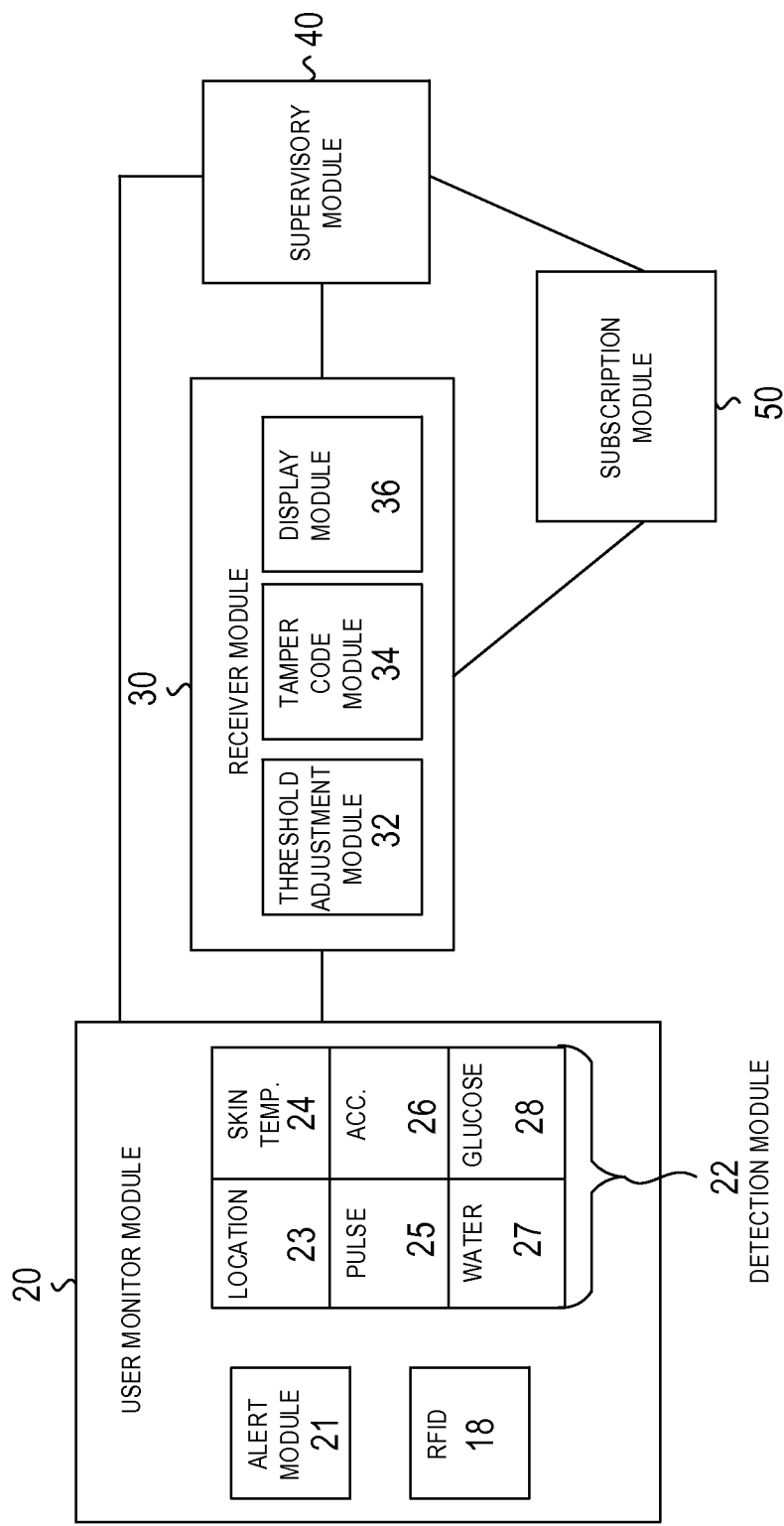
FIG. 1 is a block diagram illustrating the components of a subscription system.

FIG. 1 is a schematic diagram of the components of a subscription system 10 that may be used to monitor the well-being of a user. As used herein, well-being refers to any parameter associated with the user that may be measured and/or detected, and which provides an indication as to a status of the user. The subscription system 10 includes a user monitor module 20 that is operably coupled to a receiver module 30. The receiver module 30 is operably coupled to a supervisory module 40. The user monitor module 20 may also be operably coupled to the supervisory module 40 alone, or in tandem with the receiver module 30. Coupling may be achieved using wireless means, including for example, a satellite system and/or cellular telephone networks. Additionally, coupling may be achieved by using Blue Tooth technology, which provides short range, wireless connectivity between common devices. Blue Tooth systems operate at a frequency of 2.4 GHz. Blue Tooth systems are described in detail in Haartsen, "Bluetooth—The Universal Radio interface for Ad Hoc, Wireless Connectivity", Ericcson Review No. 3, 1998, pp. 110-117, which is hereby incorporated by reference. The subscription system 10 allows a supervisor to monitor the well-being of a user from a remote location. The user may be, for example, a child, an adult, an animal or other living entity. The supervisory module 40 may be operated by, or in the possession of the supervisor of the user. For example, the supervisor may be a child's parent, the child my have affixes the user module 20, and the parent may be carrying the supervisory module 40. In the case of adult users, the subscription system 10 may be used, for example, for the mentally or physically infirm.

The user monitor module 20 is a portable device that may include a transmitter capable of emitting one or more kinds of signals and a receiver capable of receiving an external signal. The user monitor module 20 may be capable of being incorporated into common articles of clothing or other personal items, including for example, wrist watches, jewelry, collars and toys, or other devices used by the user (e.g. stroller, bicycle, wheelchair). Alternately, the user monitor module 20 may be a stand-alone device that is designed to be worn or attached to the user. The user monitor module 20 may also be a small device that is designed to be implanted in the body of the user. Additionally, the user monitor module 20 may comprise a radio frequency identification device (RFID) 18 that may comprise a passive transponder in the focus of a microthin, wearable electronic chip. The RFID 18 is capable of drawing power from radio frequency waves and using that power to transmit a signal carrying an identification of the RFID 18. Radio frequency identification devices and corresponding systems and methods are described in U.S. Pat. No. 5,528,222, entitled RADIO FREQUENCY CIRCUIT AND MEMORY IN THIN FLEXIBLE PACKAGE, which is hereby incorporated by reference.

The user monitor module 20 may provide a first indication of the users well-being, where the first indication may have a threshold value. The user monitor module 20 may comprise an alert module 21 and a detection module 22. The alert module 21 is capable of generating and sending an alarm when the user monitor module 20 is subjected to tampering. The alarm from the alert module 21 may be generated at the location of the user monitor module 20 the receiver module 30 or the supervisory module 40. The alarm may be an audible, visual or sensory alarm. The detection module 22 detects the occurrence of one or more events related to the well-being of the user and comprises a location detector 23, a user skin temperature detector 24, a user pulse detector 25, an acceleration detector 26, a water detector 27 and a blood glucose detector 28. Other detectors may also be incorporated into the user module 20 to detect, monitor, measure and report parameters associated with a status of the user.

The receiver module 30 is a remote device that may include a transmitter capable of emitting one or more kinds of signals and a receiver capable of receiving an external signal. The receiver module 30 may also be capable of emitting radio frequency waves, thereby setting up a magnetic field around the receiver module 30. The receiver module 30 may be located at a site remote from the user monitor module 20 and the supervisory module 40. The receiver module 30 may receive the first indication of the user's well-being and generate a second indication when a threshold value of the first indication is reached. The receiver module 30 may include a threshold adjustment module 32 that provides for adjustment of the threshold value of the first indication, a tamper code module 34 adapted to provide a code that arms and disarms the alert module 21 and a display module 36 that provides a display related to the received first indication. The receiver module 30 may display information related to the received first indication on the display module 36 in addition to generating the second indication to be transmitted to the supervisory module 40. The display module 36 may be, for example, a monitor adapted for use in the receiver module 30.

FIG. 1 shows a single receiver module 30. However, the system 10 may include more than one receiver module 30. For example, one receiver module 30 may be located at a location of the supervisor and another receiver module may be located at a site remote from the supervisor. When the receiver module 30 and the supervisory module 40 are at a same location as the supervisor, the receiver module 30 and the supervisory module 40 may be incorporated into a single platform. Alternatively, the receiver module 30 and the supervisory module 40 may be separate, stand-alone devices.

The supervisory module 40 may receive the second indication and may inform the supervisor that the threshold value of the first indication has been reached. Alternately, the supervisory module 40 may receive the first indication transmitted by the user monitor module 20 directly, either alone or in tandem with the receiver module 30. The supervisory module 40 may be operably coupled to or incorporated into various devices, including for example, land based or cellular telephones, pagers, personal computers and televisions. The supervisory module 40 may send an alert in the form of a call to a land based or cellular telephone, a page to a pager, an email to a personal computer or a message for display on a television to inform the supervisor that the threshold value of the first indication has been reached. Alternately, the supervisory module 40 may comprise a stand-alone device that is capable of generating an audible, visual or sensory alarm to inform the supervisor that the threshold value has been reached. The supervisor may utilize one or more of these devices to monitor the user. The supervisory module 40 may employ a round-robin alert scheme to send alerts to all or some subset of the devices, as designated by the supervisor, until an acknowledgement is received from at least one of the devices, to inform the supervisor that the threshold value of the first indication has been reached. The supervisory module 40 may also be capable of emitting radio frequency waves, thereby setting up a magnetic field around the supervisory module 40.

A subscription module 50 may be incorporated into the system to calculate a subscription fee to charge the supervisor for operation of the system 10 in monitoring the status or well-being of one or more users under the care or supervision of the supervisor. The architecture and operation of the subscription module 50 will be described in detail later.

Figure 2:
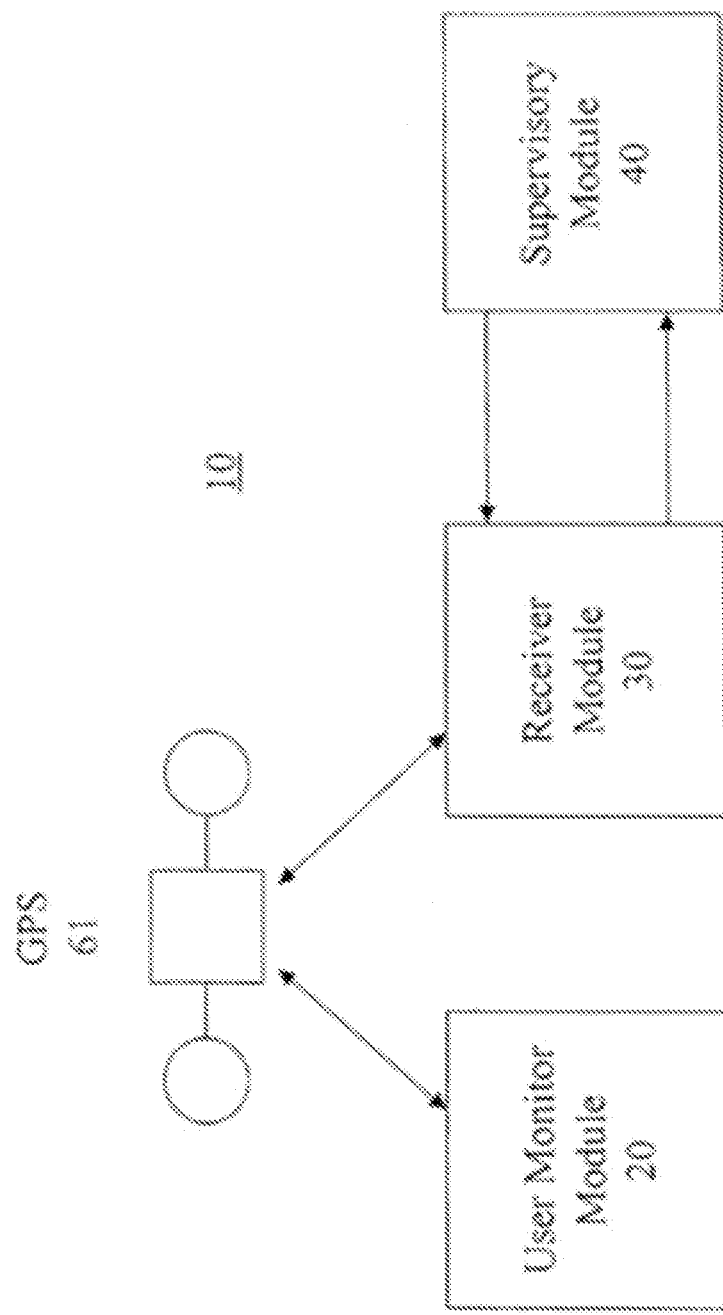
FIG. 2 is a schematic diagram of a first aspect of the subscription system of FIG. 1.

FIG. 2 is a schematic diagram of a first aspect of the subscription system 10. In FIG. 2, the subscription system 10 is used to track the location of the user monitor module 20, which may be worn or attached to a user or may be incorporated into a device used by the user (e.g., stroller, bicycle, wheelchair). Optionally, the supervisor transmits a request from the supervisory module 40 to the receiver module 30 for the location of the user monitor module 20. Through the use of various satellite systems, such as a Global Positioning System (GPS), including GPS satellite 61, the receiver module 30 receives a tertiary indication of the geographical location of the user monitor module 20. Other tracking means may employ low earth orbit satellites and cellular networks. The receiver module 30 is capable of keeping track of the location of the user monitor module 20 at all times. The receiver module 30 receives and processes the request from the supervisory module 40 and transmits the geographical location information for the user monitor module 20 to the supervisory module 40. The receiver module 30 may display the geographical location information on the display module 36 alternately or in addition to transmitting the geographical location information to the supervisory module 40. Such display may include latitude and longitude, distance, reference to map coordinates, or any other means for referencing the user's geographical location.

Figure 3A:
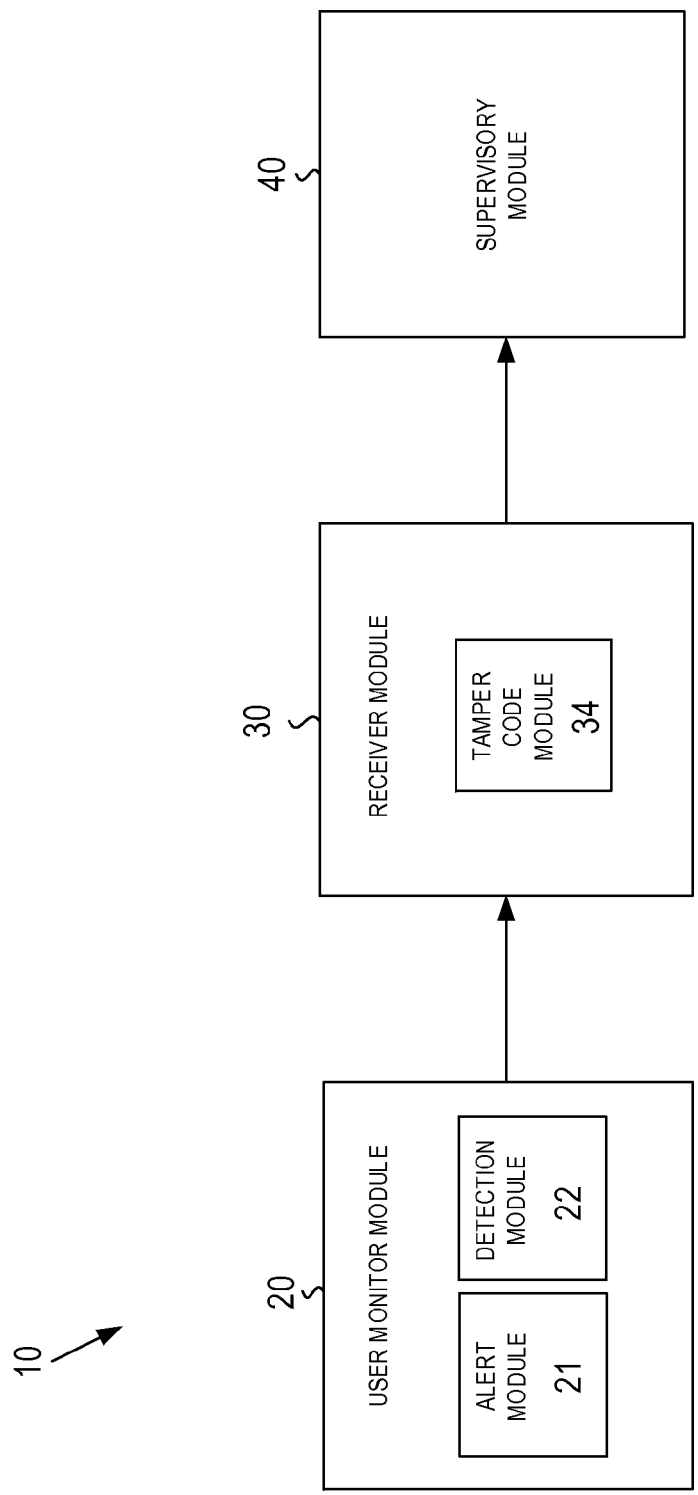
FIG. 3A is a schematic diagram of a second aspect of the subscription system of FIG. 1.

FIG. 3A is a schematic diagram of a second aspect of the subscription system 10. In FIG. 3A, the subscription system 10 may be used as a personal security alarm system, a drowning alarm system, a personal health warning system and a tampering alarm system.

For a personal security alarm system, the user may activate the alert module 21 of the user monitor module 20 in situations were the user is made aware of personal risk from harm, or becomes ill or injured. Upon activation of the alert module 21, a first indication is transmitted to the receiver module 30. The receiver module 30 receives the first indication and transmits a second indication in the form of an alarm to the supervisory module 40. The supervisory module 40 may inform the supervisor of the alarm through various means, including for example, a land based or cellular telephone, a pager, a personal computer, a television or a stand-alone device that is capable of generating an audible, visual or sensory alarm to inform the supervisor. Alternately, the user monitor module 20 may transmit the first indication directly to the supervisory module 40 alone or in tandem with the receiver module 30. Alternately, the user monitor module 20 may transmit the first indication directly to emergency personnel, including for example, a police department, a fire department, search and rescue workers, and emergency medical technicians, alone or in tandem with the receiver module 30 and the supervisory module 40. The emergency personnel may be able to track the location of the user as described above with respect to the first aspect of the subscription system 10. In an embodiment, the emergency personnel may be equipped with a receiver module 30.

In the case of a drowning alarm system, the user monitor module 20 transmits a first indication of the user's well-being when the user monitor module 20 is immersed in water. The water detector 27 (see FIG. 1) of the detection module 22 detects when the immersion in water reaches a threshold value. The water detector 27 may include a pressure gage, which measures the ambient pressure immediately surrounding the user monitor module 20. Alternately or additionally, the water detector 27 may include a moisture gage capable of measuring the moisture level immediately surrounding the user monitor module 20. The receiver module 30 receives the first indication and transmits a second indication to the supervisory module 40 when the pressure or moisture level immediately surrounding the user monitor module 20 reaches the threshold value. The supervisory module 40 informs the supervisor that the threshold value has been reached. Alternately, the user monitor module 20 may transmit the first indication directly to the supervisory module 40 alone or in tandem with the receiver module 30.

In the case of a personal health warning system, the user monitor module 20 transmits a first indication of the user's well-being to the receiver module 30 when the detection module 22 of the user monitor module 20 detects one or more changes in the physical condition of the user. Referring to FIG. 1, the skin temperature detector 24 detects when a change in skin temperature of the user reaches a threshold value. The pulse detector 25 detects when a change in pulse of the user reaches a threshold value. The acceleration detector 26 detects when a change in acceleration of the user's body reaches a threshold value. Additionally, the acceleration detector 26 detects when a lack of change in acceleration of the user's body reaches a threshold value. The glucose detector 28 detects when a change in the blood glucose level of the user reaches a threshold value. When one of the detectors in the detection module 22 detects a change in physical condition of the user that reaches a respective threshold value, the receiver module 30 transmits a second indication to the supervisory module 40. The supervisory module 40 informs the supervisor that the respective threshold value has been reached. Alternately, the user monitor module 20 may transmit the first indication directly to the supervisory module 40 alone or in tandem with the receiver module 30.

Returning to FIG. 3A, in the case of a tampering alarm system, the user monitor module 20 transmits a first indication to the receiver module 30 when the user monitor module 20 experiences tampering. The supervisor may arm and disarm the alert module 21 of the user monitor module 20 by inputting a code into the tamper code module 34 of the receiver module 30. Tampering may include attempts to remove the user monitor module 20 after the alert module 21 is armed without inputting the appropriate code into the tamper code module 34. Upon tampering, the alert module 21 may generate an alarm at the location of the user monitor module 20 and/or transmit the first indication to the receiver module 30. The receiver module 30 generates and transmits a second indication to the supervisory module 40 upon receiving the first indication. The supervisory module 40 informs the supervisor that the user monitor module 20 has experienced tampering. Alternately, the user monitor module 20 may transmit the first indication directly to the supervisory module 40 alone or in tandem with the receiver module 30.

As noted above, some or all of the features of the receiver module 30 may be incorporated into the supervisory module 40. In particular, the threshold adjustment module 32 and the tamper code module 34 may be incorporated into the supervisory module 40, and interactions between the supervisor and the tamper code module 34 and threshold adjustment module 32 may be made directly by the supervisor.

Figure 3B:
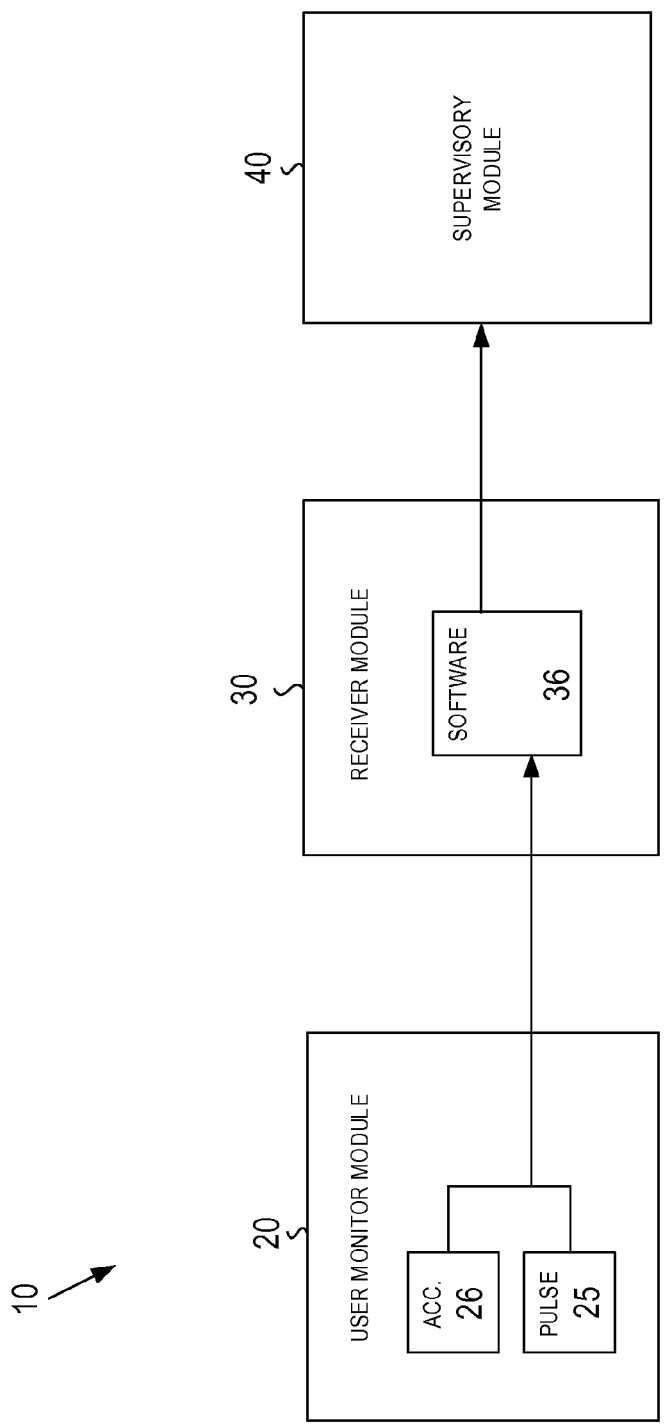
FIG. 3B is a schematic diagram of the second aspect of the subscription system of FIG. 1 using smart software.

As shown in the schematic diagram of FIG. 3B, smart software 36 may be installed in the user monitor module 20, the receiver module 30 and/or the supervisory module 40 to determine whether to alert the supervisor when several events related to the well-being of the user occur at the same time. For example, if the acceleration detector 26 detects that there has been a lack of acceleration (or motion) of the user's body that reaches a threshold value and the pulse detector 25 detects a decrease in pulse that also reaches a threshold value, the software 36 may determine that the combination of the two events indicates that the user is asleep. In that situation, the receiver module 30 may defer transmitting the second indication to the supervisory module 40 unless both events continue for a prolonged period of time.

Figure 4:
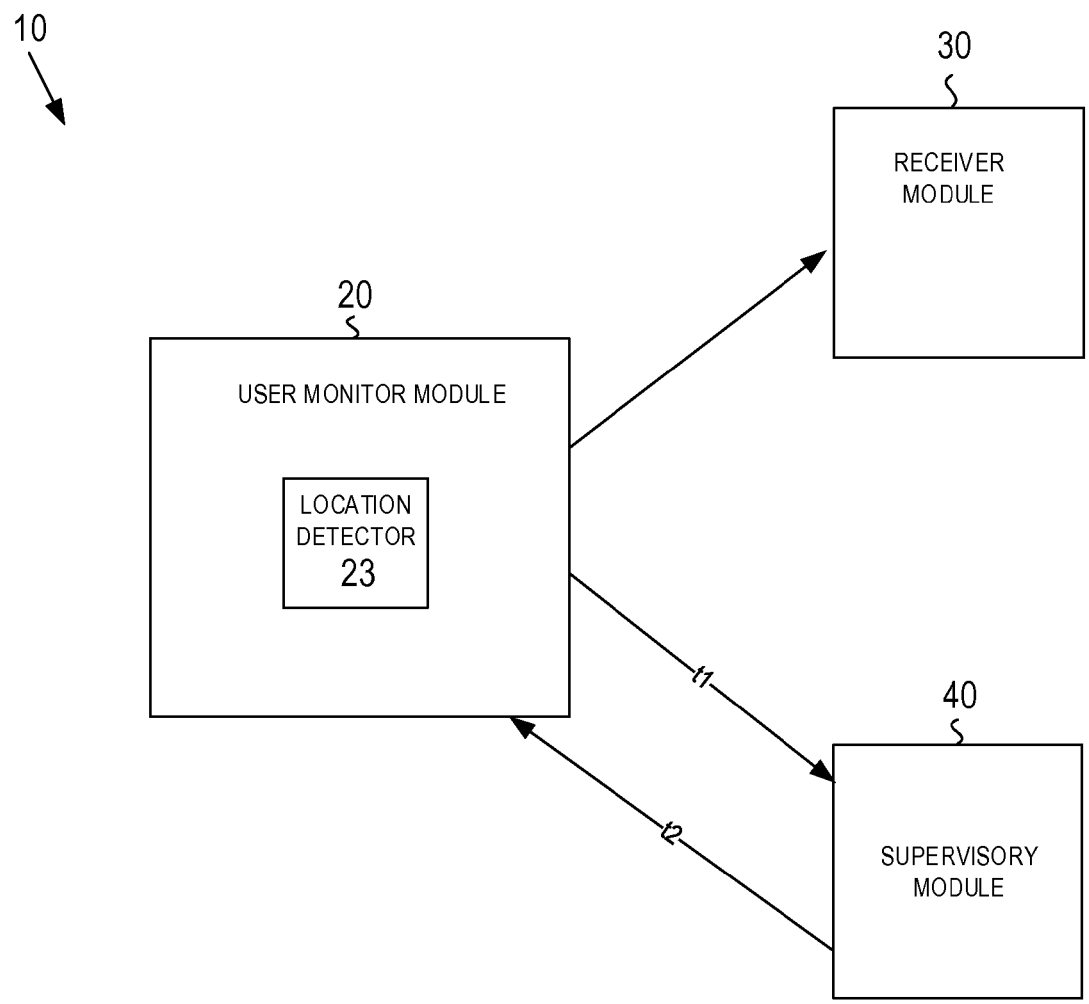
FIG. 4 is a schematic diagram of a third aspect of the subscription system of FIG. 1.

FIG. 4 is a schematic diagram of a third aspect of the subscription system 10. In FIG. 4, the subscription system 10 may be used as an electronic leash or electronic boundary system for keeping track of the distance between the user monitor module 20, which may be worn or attached to the user, and the supervisory module 40 or an electronic boundary. As discussed above, the user may be, for example, a child, a mentally or physically infirm adult, an animal or any other live entity.

In using an electronic leash, the supervisor wants to ensure that the user does not stray beyond a predetermined distance from the supervisor. The user monitor module 20 transmits a first indication when the location detector 23 of the user monitor module 20 detects that the distance between the user monitor module 20 and supervisory module 40 reaches a threshold value. The location detector 23 may detect the distance using various methods. For example, the supervisory module 40 may transmit a signal on a periodic basis that is received by the location detector 23 in the user monitor module 20. The location detector 23 compares the strength of the signal received from the supervisory module 40 at different time, $t_1$ and $t_2$, and correlates the difference in signal strength to a distance between the user monitor module 20 and supervisory module 40. When the location detector 23 detects that the distance between the user monitor module 20 and the supervisory module 40 reaches the threshold value, the user monitor module 20 transmits a first indication to the receiver module 30, which then generates and transmits a second indication to the supervisory module 40. Alternately, the user monitor module 20 may transmit the first indication directly to the supervisory module 40 alone or in tandem with the receiver module 30. The supervisory module 40 informs the supervisor that the threshold value has been reached.

Figure 5:
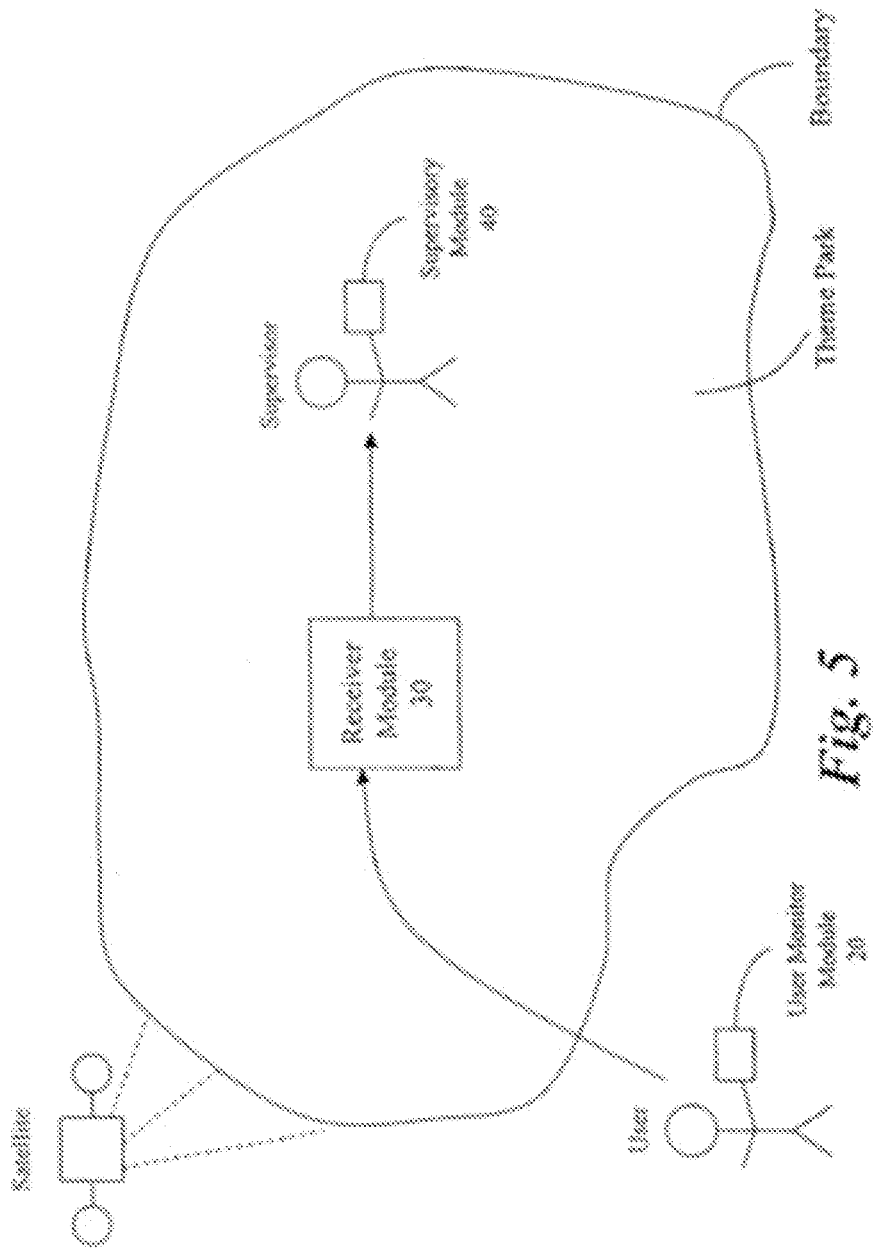
FIG. 5 is a schematic diagram illustrating the use of the subscription system of FIG. 1 applied to an electronic boundary.

FIG. 5 is a diagram illustrating the use of the subscription system 10 applied to an electronic boundary. The subscription system 10 may be adapted for use in a theme park, a shopping mall, a stadium, a mass transit station and other large locales that typically attract many people, and that may have a large, transitory population, or may have a population that is constantly moving from one place to another within the large locale. For example, in a popular theme park, the population may be large, transitory in the sense that the number of people in the population, and their specific identity varies over time, and mobile, in the sense that individuals move from one venue in the theme park to another venue, typically staying at each venue only for a short time. The user monitor module 20 transmits a first indication to the receiver module 30 when the location detector 23 detects that that the user monitor module 20 is beyond the designated boundary of the large locale. The boundary may be defined using electronic boundary markers physically placed along the perimeter of the boundary. Alternately, the boundary may be defined using a satellite system, such as, for example, the Global Positioning System, in order to avoid using physical boundary markers. By using a satellite system, the boundary may be dynamically configurable and altered in a convenient manner. For example, the GPS may be used to define the overall theme park boundary, or a boundary of a sub-section of the theme park. More specifically, should a supervisor want to monitor a status of a user, with the user expected to remain in a first sub-section of the theme park, the supervisor may specify the dynamically-configurable boundary to be the boundary of the first sub-section. The GPS responds by designating the first sub-section of the theme park as the desired boundary for the specified user. Other users and supervisors using the subscription system 10 may have other boundaries defined for monitoring the status of the user.

The user monitor module 20 transmits the first indication to the receiver module 30 when the location detector 23 detects that the boundary has been crossed by the user. The receiver module 30 generates and transmits a second indication to the supervisory module 40, which informs the supervisor that the user has crossed the boundary. Alternately, the user monitor module 20 may transmit the first indication directly to the supervisory module 40 alone or in tandem with the receiver module 30.

Figure 6:
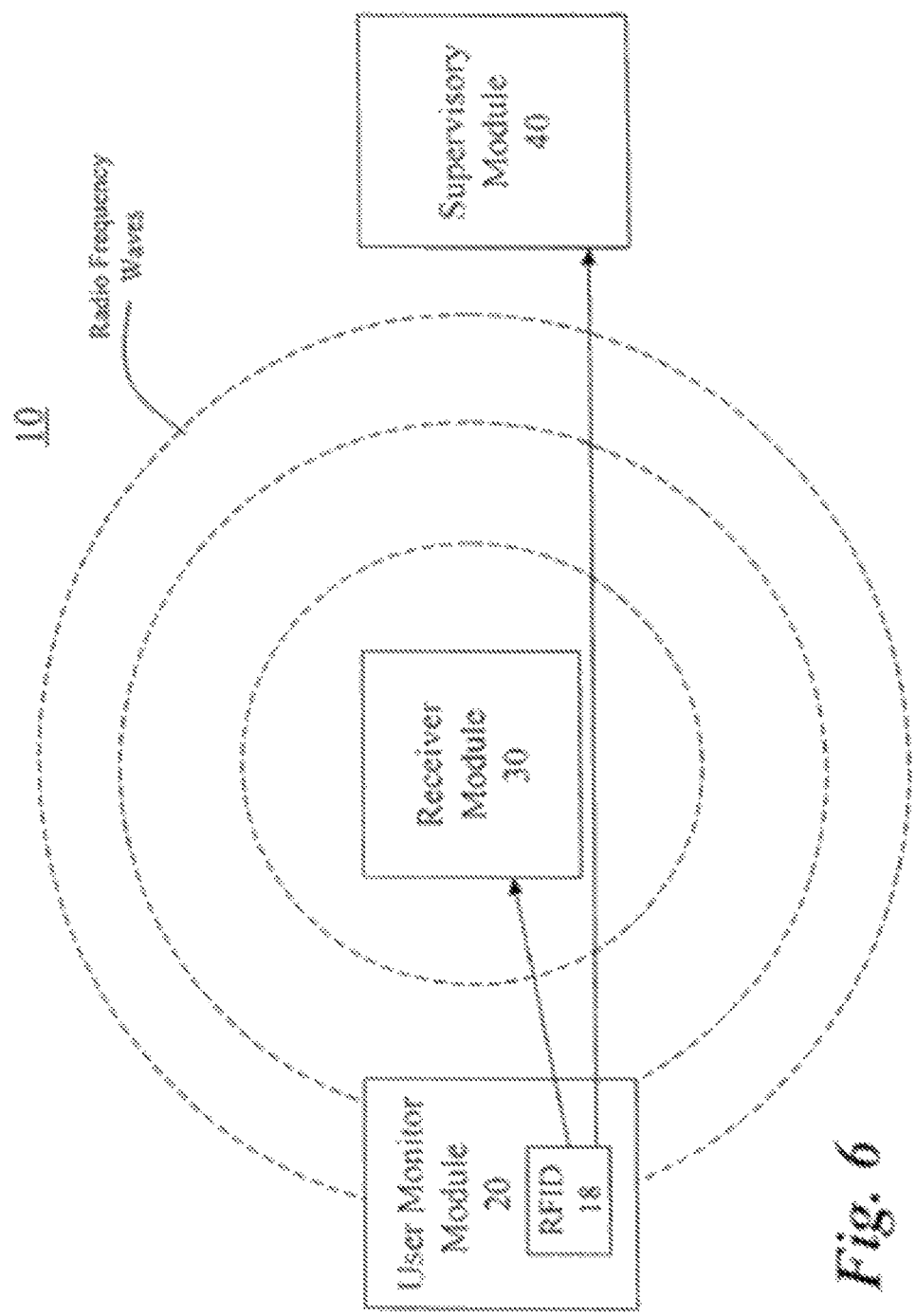
FIG. 6 is a schematic diagram of a fourth aspect of the subscription system of FIG. 1.

FIG. 6 is a schematic diagram of a fourth aspect of the subscription system 10. In FIG. 6, the subscription system is used to identify the user monitor module 20 in order to identify the user. The receiver module 30 emits radio frequency waves so that a magnetic field is formed around the receiver module 30. Alternately, the supervisory module 40 may emit radio frequency waves so that a magnetic field is formed around the supervisory module 40. The user monitor module 20 may comprise a RFID 18, which may include a passive transponder in the form of a micro-thin wearable, or implantable, electronic chip. The RFID 18 is capable of drawing power from the emitted radio frequency waves and using that power to transmit a signal carrying, an identification of the RFID 18. The signal may be transmitted to the receiver module 30 and/or the supervisory module 40 to inform the supervisor of the identity of the RFID 18, which may be correlated to the identity of the user wearing or carrying the user monitor module 20.

Figure 7A:
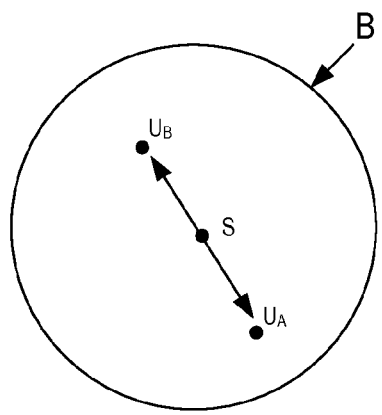
FIGS. 7A-7C and 8 show further aspects of the subscription service of FIG. 1.

A potential application for using multiple user monitor modules 20 includes tracking the location of a number of children or ensuring that none of the children stray too far from the supervisor in order to prevent the children from becoming lost. FIG. 7A illustrates the system 10 used to track the well-being or status of more than one user by a single supervisor. In FIG. 7A, a supervisor S desires to track the location of user $U_A$ and user $U_B$. Each of the users $U_A$ and $U_B$ are equipped with a user monitor module 20. The user monitor modules 20 worn by the users $U_A$ and $U_B$ may have unique identification numbers to identify the user monitor module 20. Transmissions from the user monitor module 20 may include the unique identification numbers. As an alternative to user monitor module identification numbers, each user monitor 20 module may transmit and receive at a unique frequency. A supervisor S is equipped with a supervisory module 40 to receive alerts and to otherwise communicate, either directly or indirectly, with the subscription system 10. As shown in FIG. 7A, the supervisory module 40 receives tracking or location information for the users $U_A$ and $U_B$ as the users $U_A$ and $U_B$ move within boundary 13. Note that the boundary B may be established by the supervisory designating a maximum radius from the supervisory module 40 to the user monitor modules 20, and that the specified maximum radius may differ as between the users $U_A$ and $U_B$.

Figure 7B:
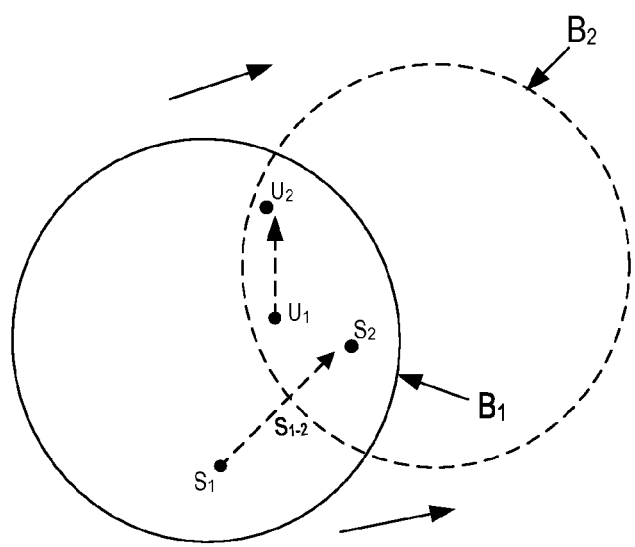

FIG. 7B illustrates the effect of movement by the supervisory module 40 on the tracking function performed by the subscription system 10. In FIG. 7B, supervisory module 40 is moved by supervisor S from first position $S_2$ to second position $S_2$ along path $S_1$-$S_2$. User U moves from position $U_1$ to position $U_2$. Boundary $B_1$ denotes the boundary for tracking the location of the user U while the supervisor is at the first position $S_1$. As the supervisor (and the supervisory module 40) moves to the second position $S_2$, the boundary moves to new boundary $B_2$ as shown.

Figure 7C:
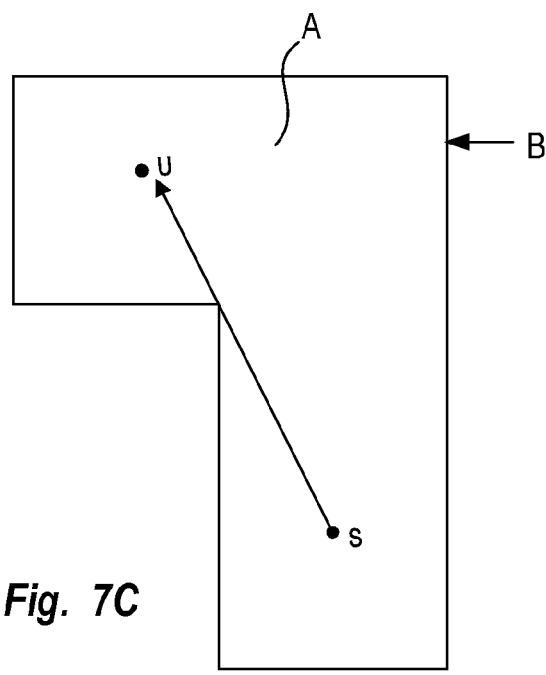

FIG. 7C illustrates yet another application of the subscription system 10. In FIG. 7C, the supervisor S want to monitor a location of the user U. However, the supervisor S wants to confine the user U to an area A having an irregular boundary B as shown. The subscription system 10 can accommodate such a scenario by using the satellite system (e.g., the GPS) to dynamically establish the boundary B. The subscription system 10 components can then be used to track the location of the user U within the boundary B of the area A, and to issue an alert should the user U go outside or beyond the boundary B.

Figure 8:
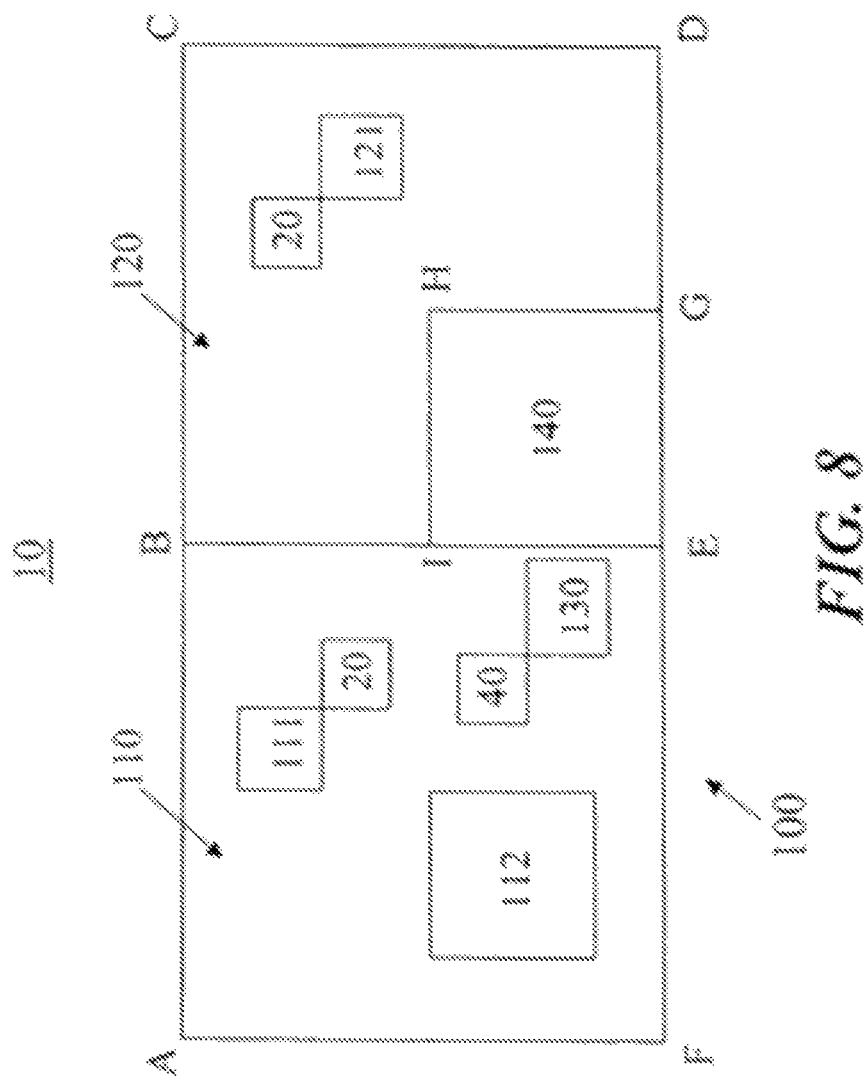

FIG. 8 illustrates still another application of the subscription system 10. In FIG. 8, an area 100, defined by the points A, C, D, F, includes sub-areas 110, defined by A, B, E, F and 120, defined by B, C, D, E. The sub-area 110 includes an exclusion area 112. A first user 111 occupies the sub-area 110. A second user 121 occupies the sub-area 120. The first user 111 and the second user 121 each may be equipped with, or be operably coupled to, or in the vicinity of a user monitor module 20. A supervisor 130, equipped with a supervisory module 40 may be anywhere in the area 100, or may be outside the area 100. An overlap area 140, designated by the verticies E, G, H, I may be provided in which both the first user 111 and the second user 121 may exist simultaneously without precipitating an alert.

The supervisor 130 may desire to monitor well-being of each of the first user 111 and the second user 121. The supervisor 130 may further desire to ensure the first user 111 remains in the first sub-area 110 and that the second user 121 remain in the second sub-area 120. Finally, the supervisory 130 may desire that the first user not enter the exclusion area 112.

The supervisor may designate the boundaries of the area 100, the sub-areas 110 and 120, the exclusion area 112, and the overlap area 140. Such designation may be by way of a drafting protocol available at a Web site associated with the subscription system 10. Other means for designating the allowable boundaries include by reference to latitude and longitude, by submission of a hand-drawn figure, and by reference to specific, fixed landmarks, for example.

The subscription system 10 may be designated to issue an alert to the supervisor 130 when both the first user 111 and the second user 121 are in the same sub-area, except for the overlap area 140. For example, should the second user 121 enter the sub-area 110 while the first user 111 is in the sub-area 110, the subscription system 10 may be designated to issue the alert. The subscription system 10 may include the necessary logic and processing to determine when the first user 111 and the second user 121 are in a same sub-area, and the subscription system 10 will then issue the required alerts. The subscription system 10 may also be designated to issue an alert should either the first user 111 or the second user 121 enter the exclusion area 112.

As an example of an application of the subscription system 10 shown in FIG. 8, the first user 111 may be a dog, the second user 121 a child, the first sub-area a back yard of a residence, the exclusion area 112 a swimming pool, the supervisor 130 the child's parent, the sub-area 120 some or all of a residence, and the overlap area 140 a kitchen and family room of the residence. The supervisor 130 desires to keep the child 121 and the dog 111 out of the pool 112, and keep the child 121 and the dog 111 separated unless both are in the kitchen and/or family room 140.

Figure 9:
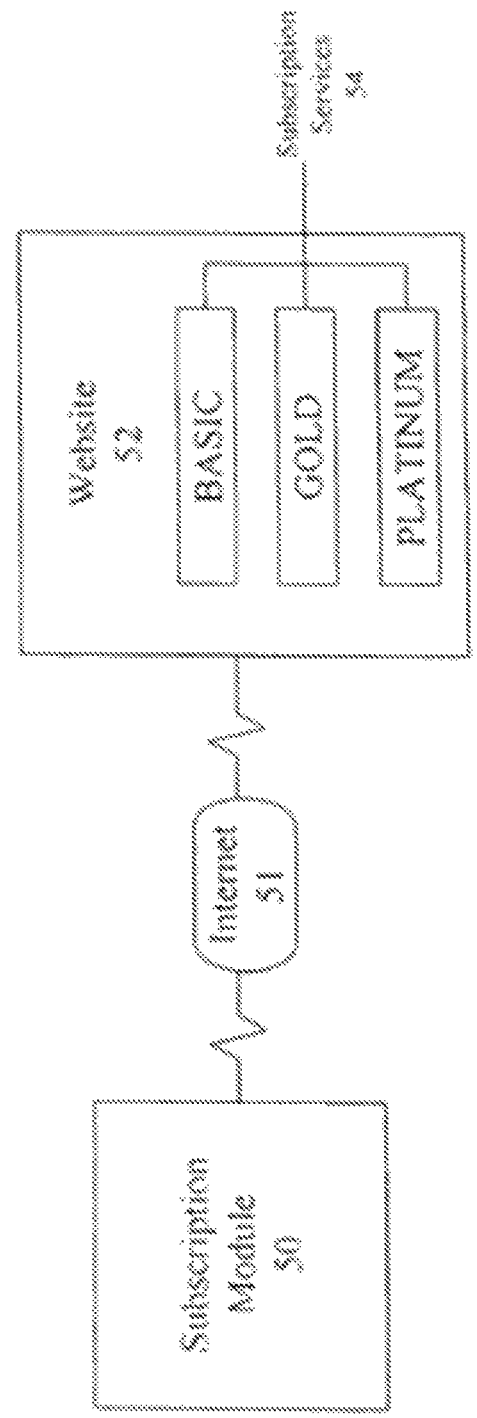
FIG. 9 is a block diagram illustrating a service level of a subscription module.

FIG. 9 is a block diagram illustrating a level of service operation of the subscription module 50. The subscription module 50 may be operably coupled to the Internet 51 and may use a Web site 52 to interact with customers. The subscription module 50 may offer various subscription services 54 displayed on the Web site 52 and may allow customers to select from among the subscription services 54. For example, the subscription services 54 offered may be tiered in levels of service from basic to gold to platinum with each level of service described on the Web site 52. Levels of service may relate, for example, to geographical coverage, types of monitoring (e.g., location tracking, personal health warning, system, electronic leash) and alert options. Customers may select the level of service that suits their needs. The customers may or may not be supervisors.

Subscription fees may be calculated by the subscription module 50 based on the level of service selected and based on a flat rate or a pro rata rate or some combination of a flat and pro rata rate. For a pro rata rate, the subscription module 50 may record each instance when the supervisory module 40 alerts the supervisor, calculate the subscription fee based on a number of the instances recorded and send a request for payment to the customer. For full-time, continuous monitoring, the cost of any hardware may be fully underwritten by the subscription fees. Additionally, reduced rates may be offered if monitoring is not required on a continuous basis. For example, customers may desire monitoring only on weekends or desire to participate in a subscription service 54 on an ad hoc basis for temporary, finite periods of time.

After a customer signs up for a level of service, any required hardware may be shipped to the customer and any required software may be downloaded from the Web site 52 or shipped to the customer along with the hardware. Instructions for using subscription services may be provided on the Web site 52 in a graphical user interface (GUI) format and/or shipped to the customer. Billing may be automated and requests for payment may be deducted directly from the customer's bank account or mailed to the customer. After selecting a level of service, customers may be given a grace period to test the service for satisfactory performance and suitability.

Customers may select alert options on the Web site 52. Customers may register land based telephones, cellular telephones, pagers, televisions and personal computers to receive alerts. Alternately, these devices may be used to signal receipt of an alert, at which time the customer may check the supervisory module 40 or the receiver module 30 for further information. Customers may also use a dedicated, stand-alone device to receive the alert. As discussed above, the supervisory module 40 may employ a round-robin alert scheme to send alerts to all or some subset of the devices, as designated by the supervisor, until an acknowledgement is received from at least one of the devices. If no acknowledgement is received, the supervisory module 40 may alert emergency personnel or perhaps a back-up individual (e.g., a relative of the customer). Alerts may be encrypted so that only a customer's devices may receive alerts intended for the customer. Additionally, customers may allow access to monitoring alerts to third parties, including for example, emergency personnel and back-up individuals.

Customers may change their level of service or any aspect of their current level of service at any time by accessing the Web site 52. Changes may be made by accessing a customer profile saved on the Web site 52 and password protected for privacy. Additionally, the subscription module 50 may perform upgrades as new features or technology become available. For example, a customer's devices may have software upgrades loaded automatically over an appropriate transmission medium.

Figure 10:
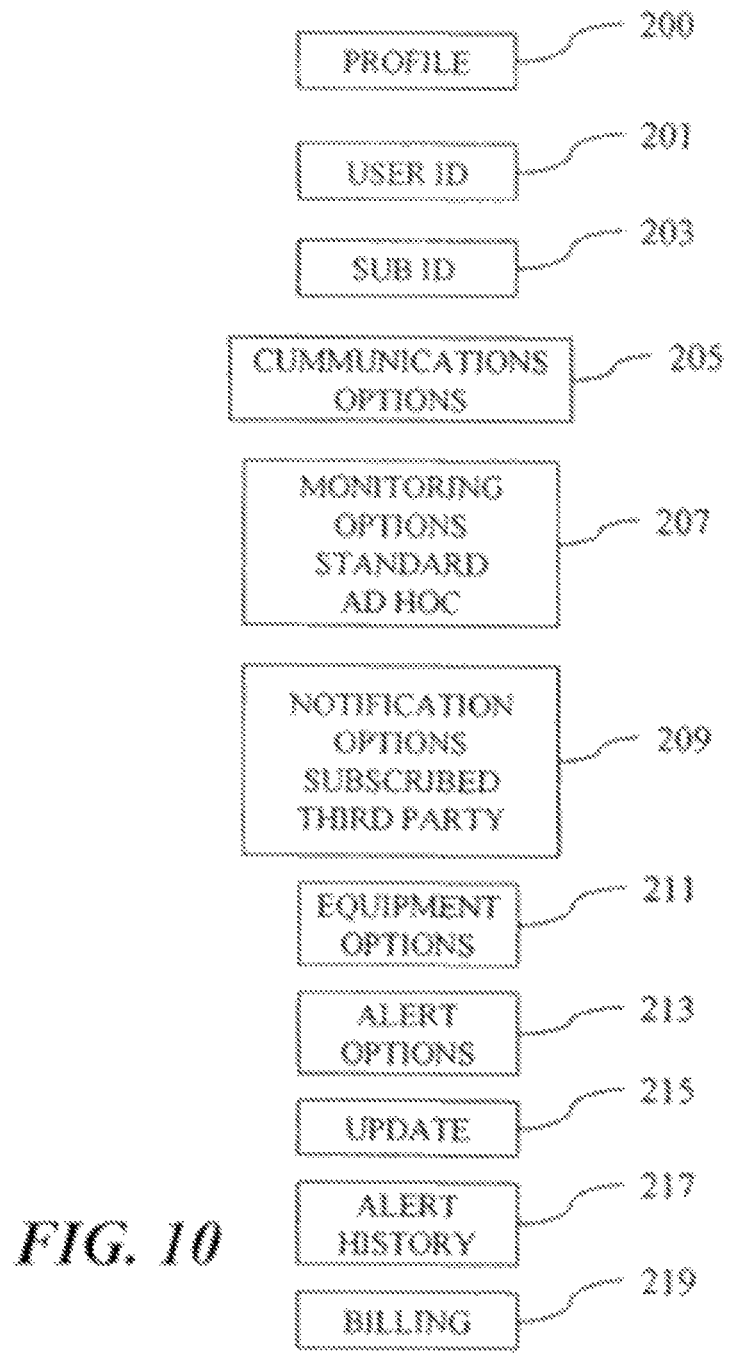
FIG. 10 illustrates a customer profile used by the subscription system of FIG. 1.

FIG. 10 illustrates an embodiment of a customer profile, or data structure, 200 that may be used with the subscription system 10 of FIG. 1. The profile 200 may exist as a data structure maintained at a remote location such as the subscription module 50 (see FIG. 1). Portions of the customer profile 200 may be replicated in the user module 20, the receiver module 30 and the supervisory module 40 (see FIG. 1). The customer profile 200 may be completed based on information provided by the customer using the Web site 52 (see FIG. 9) using, for example, an on-screen menu, or by other means, including orally with a representative of the subscription system 10, and by written input from the customer, for example.

The profile 200 includes a user identification (ID) section 201 where a user may be identified and assigned a means for tracking the user, such as an alpha-numeric identification. A subscriber ID section 203 similarly identifies a subscriber and links the subscriber to the user. Next, a communications options section 205 allows the customer to specify which communications options the customer desires for issuing alerts. A monitoring options section 207 allows the customer to specify monitoring options. Examples of monitoring options include standard, where the user is monitored continually, or at a set time and day (for example, 2-4 p.m., Monday through Friday), and ad hoc, where the subscriber requests monitoring on an as-needed basis. A notification option section 209 allows the customer to select notification of the subscriber, and notification of one or more third parties.

Different third parties may be designated for receipt of different alerts. An equipment options section 211 specifies the equipment used in monitoring the user identified in the profile. The equipment includes the supervisory module 40 and the user module 20 (see FIG. 1), which may be specified by name, serial number, and model information, for example. An alert options section 213 allows the customer to designate specific alerts for the user. For example, the customer may designate that an alert be issued should the user module 20 pass a designated boundary, or move beyond a designated distance from the supervisory module 40. The data contained in the data structures of the alert options section 213, the equipment options section 211, and the notification options section 209 must be consistent. For example, should the customer specify distance monitoring, the equipment options section would store information related to the types of devices needed for distance monitoring.

Also included in the profile 200 may be a last software update section 215, which contains data related to software used by the customer's designated equipment configuration. An alert history section 217 may store data related to alerts issued for the user designated in the profile 200. Such information may include alert type, time and date, response time to answer the alert, and other information. Finally, a billing options section 219 may be used to specify how the customer is to be billed for the subscription system service. For example, the billing options section 219 may indicate monthly billing using electronic funds transfer from the customer's bank account, and may provide the necessary bank routing code.

Figure 11:
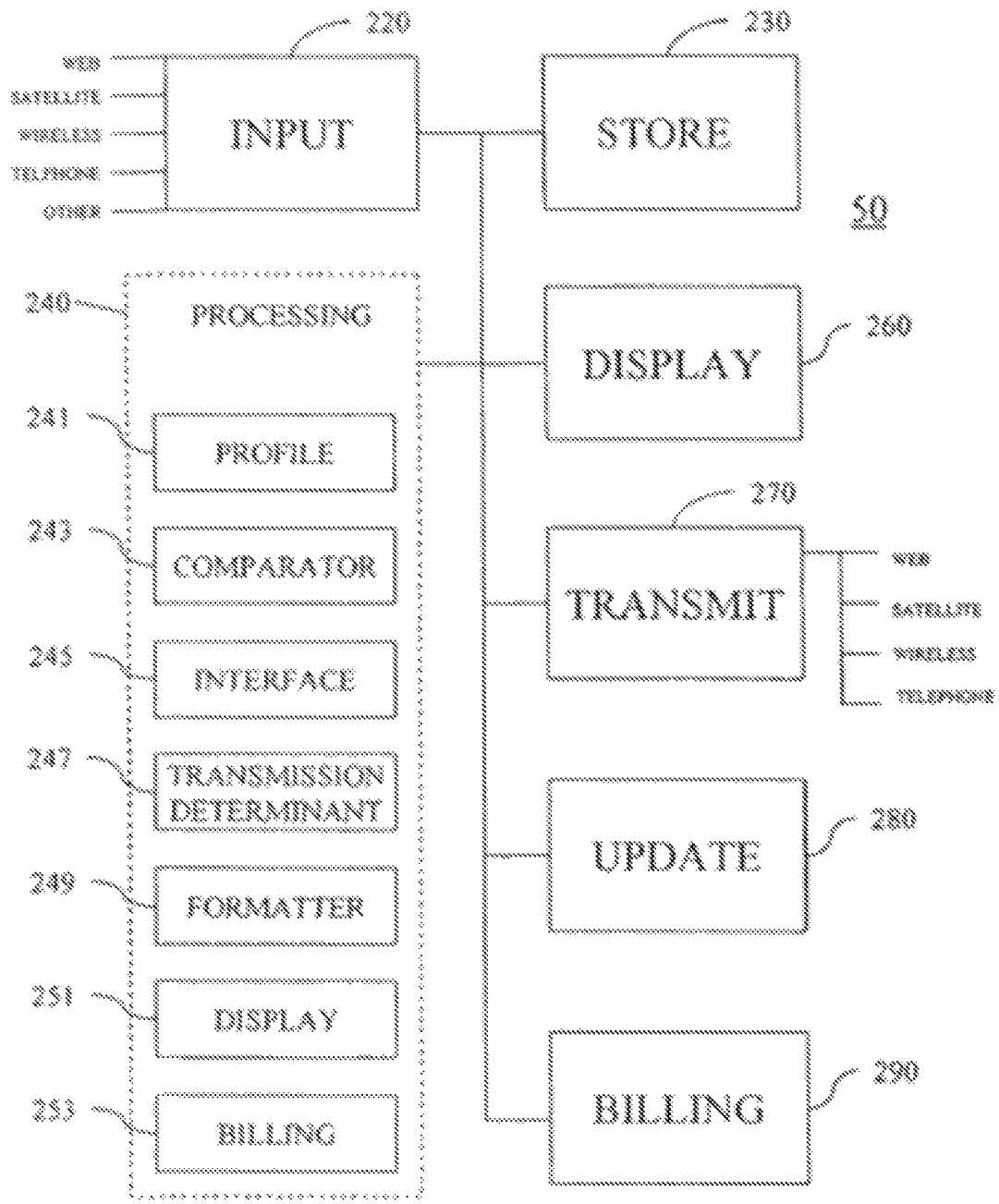
FIG. 11 is a block diagram of one aspect of the subscription module of FIG. 9.

FIG. 11 is a block diagram of one embodiment of the subscription module 50. Although FIG. 11 shows various modules incorporated into the subscription module 50, some or all these modules may be incorporated into other components or modules of the subscription system 10, including, for example, the receive module 30. The subscription module 50 may include an input module 220, a storage module 230, a processing module 240, a display module 260, a transmit module 270, an update module 280, and a billing, module 290. The input module 220 may be used by the customer to interact with the subscription system 10. Such interactions may include initial sign up for the subscription system service, creation of the profile 200, profile updates, and other interactions. The input module 220 may also be used to receive operational information such as alerts and other monitoring information needed to formulate alerts and to otherwise operate the subscription system 10. Possible input paths, as shown, include web-based inputs, satellite, wireless, telephone, and other inputs. The storage module 230 stores the profiles 200, operating programs, and other data needed to operate the subscription system 10. The processing module 240 may be used to process subscription system information, such as profile information, and to integrate operation of the subscription system 10. The processing module 240 may also be used to process monitoring information and issue alerts. The processing module 240 may include a profiler 241 that is used to generate the profiles 200, a comparator 243 that is used to generate alerts, an interface 245 that is used to translate information received from external sources such as satellites and wireless systems, a transmission determinant 247 that is used to determine how alerts should be sent, and to which parties and which subscriber communications devices, a formatter 249 that is used to format alerts and informational messages to be sent to the components of the subscription system 10; a display driver 251 that generates displays; and a billing interface 253 that cooperates with the billing module 290 to generate bills for the customer.

The display module 260 generates displays that may be used at the location of the subscription module 50. The transmit module 270 is used to transmit information, alerts, and other data to other components of the subscription system, or to other parties. The update module 280 is used to update various services, including providing updated software to the user module 20 and the supervisory module 40, for example. Finally, the billing module calculates the customer's bill based on designated use, issued alerts, and other information.

Figure 12:
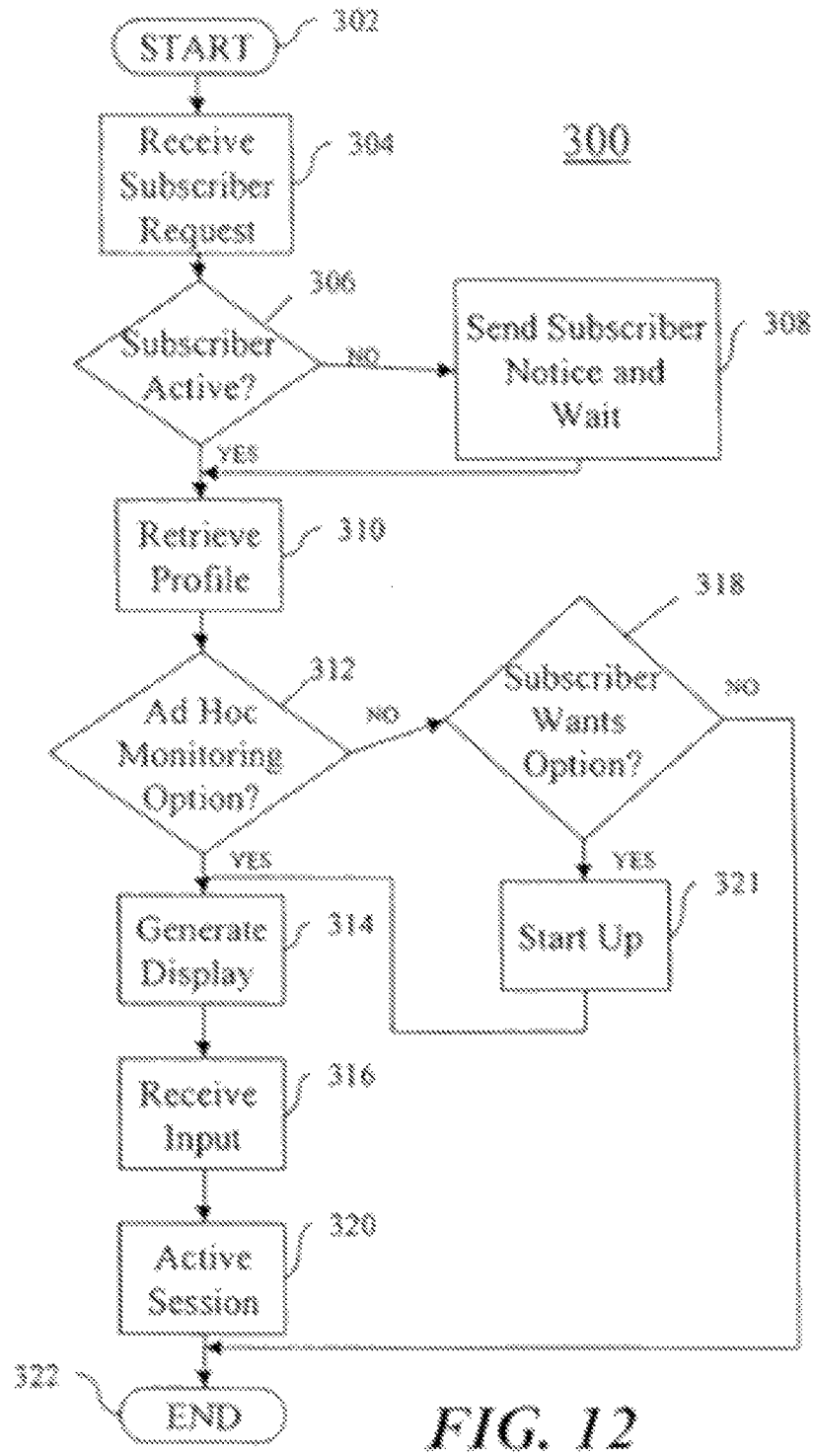
FIG. 12 is a flow chart illustrating an operation of the subscription system of Figure.

FIG. 12 is a flow chart representing, one possible monitoring set up operation 300 of the subscriptions system 10. The illustrated operation 300 may be an ad hoc monitoring set up operation of a single user. The operation 300 begins in block 302. In block 304, the subscriber notifies the subscription module 50 that the subscriber desires to monitor the user. In block 306, the processing module 240 determines if the subscriber/customer is an active member of the subscription system 10 (e.g., the customer's billing account is up-to-date). If the account is not active, the operation moves to block 308 and the subscription module provides a notification to the subscriber/customer, and waits for the account to be updated. If the service is active, the operation 300 moves to block 310 and the user profile is retrieved. In block 312, the subscription module 50 determines if ad hoc monitoring is in the profile 200. If the ad hoc is selected in the profile 200, the subscription module 50 generates a display for the supervisor to designate the parameters of the ad hoc monitoring, block 314. In block 316, the subscription module 50 receives the parameters, and performs necessary computations to set up the monitoring. The computations may include a test of the system, including the user module 20, the receiver module 30 and the supervisory module 40 to ensure that triggering events will be detected, alerts issued and received b the correct supervisor communications equipment, and alert response received and processed. If in block 312, ad hoc monitoring is not designated, the subscription module 50 will issue a prompt to the subscriber asking if set up of ad hoc monitoring is required, block 318. If such set up is not desired, the operation 300 moves to block 322 and ends. If set up is desired, the subscription module generates a set up display and returns the display to the supervisor/customer, block 321. The operation then returns to block 314.

In block 320, the ad hoc monitoring session is initiated. In block 322, the ad hoc monitoring session ends, either through expiration of the time designated for the ad hoc monitoring, or through some other action, such as issuance of a terminating alert, or at the request of the subscriber/customer.

While the present invention has been described in connection with an exemplary embodiment, it will be understood that many modifications will be readily apparent to those skilled in the art, and this application is intended to cover any variations thereof.

What is claimed:

1. A method for monitoring a user, the method comprising:
receiving, by at least one portable device, a plurality of indicators from a monitor device, at least one of the indicators corresponding to a physical characteristic of the user as monitored by the monitor device;
identifying, by the portable device, a threshold value for each of the plurality of indicators;
comparing, by the portable device, each of the plurality of indicators to its respective threshold value;
generating, by the portable device, an alert if the comparison indicates that at least one of the plurality of indicators meets or exceeds its respective threshold value; and displaying, by the portable device, each of the plurality of indicators and a representation of the corresponding physical characteristic.

2. The method of claim 1, wherein the displaying further comprises displaying, by the one or more portable devices, the alert.

3. The method of claim 1, wherein the receiving further comprises receiving via Bluetooth wireless communication.

4. The method of claim 1, wherein the one or more portable devices comprises a Bluetooth-compatible mobile phone and the receiving further comprises receiving, via Bluetooth wireless communication.

5. The method of claim 1, further comprising:
determining, by the portable device, that the plurality of indicators has not been received by the portable device within a predetermined time period;
requesting, by the portable device, that the plurality of indicators be transmitted by the monitor device; and
receiving, by the portable device, the plurality of indicators from the monitor device.

6. The method of claim 1, wherein a first indicator of the plurality of indicators corresponds to movement of the user and a second indicator of the plurality of indicators corresponds to a measure of the user's pulse.

7. The method of claim 1, further comprising:
determining, by the portable device, that first indicator meets or exceeds a motion threshold and the second indicator meets or exceeds a pulse threshold; and
delaying, by the portable device, transmission of the alert for a predetermined time period.

8. The method of claim 1, wherein a first indicator of the plurality of indicators corresponds to a measure of ambient pressure and a second indicator of the plurality of indicators corresponds to measure of moisture.

9. The method of claim 1, further comprising:
determining, by the portable device, that the first indicator meets or exceeds a pressure threshold or the second indicator meets or exceeds a moisture threshold, wherein the alert comprises a drowning warning.

10. The method of claim 1, wherein a first indicator of the plurality of indicators corresponds to a measure of the user's blood glucose level.

11. The method of claim 10, further comprising;
identifying, by the portable device, a baseline glucose level; and
setting, by the portable device, a threshold value corresponding to the first indicator based on the baseline glucose level.

12. The method of claim 1, wherein a first indicator of the plurality of indicators corresponds to a measure of the user's skin temperature.

13. The method of claim 12, further comprising:
determining, by the portable device, a baseline skin temperature; and
setting, by the one or more computers, a threshold value corresponding to the first indicator based on the baseline skin temperature.

14. The method of claim 1, further comprising:
displaying, by the portable device, a geographic location of the monitor device.

15. An article of manufacture for method for monitoring physical characteristics of a user, the article of manufacture comprising a computer-readable, non-transitory medium holding computer-executable instructions for performing the method comprising:
receiving a plurality of indicators from a monitor device, at least one of the indicators corresponding to a physical characteristic of the user as monitored by the monitor device;
identifying a threshold value for each of the plurality of indicators;
comparing each of the plurality of indicators to its respective threshold value;
generating an alert if the comparison indicates that at least one of the plurality of indicators meets or exceeds its respective threshold value; and
displaying each of the plurality of indicators and a representation of the corresponding physical characteristic.

16. The article of manufacture of claim 15, wherein the displaying further comprises displaying, by the one or more portable devices, the alert.

17. The article of manufacture of claim 15, the method further comprising:
detecting tampering of at least a portion of the monitor device; and
generating an alarm in response to the detection of tampering.

18. The article of manufacture of claim 15, the method further comprising:
determining that the message has not been received within a predetermined time period;
requesting that the plurality of indicators be transmitted by the monitor device; and
receiving the plurality of indicators from the monitor device.

19. A system for monitoring physical characteristics of a user, the system comprising:
a receiver configured to receive a plurality of indicators from a monitor device, at least one of the indicators corresponding to a physical characteristic of the user as monitored by the monitor device;
a computer processor configured to identify a threshold value for each of the plurality of indicators, compare each of the plurality of indicators to its respective threshold value, and generate a message if the comparison indicates that at least one of the plurality of indicators meets or exceeds its respective threshold value; and
a display configured to display each of the plurality of indicators and a representation of the corresponding physical characteristic.

20. The system of claim 19, wherein the receiver is further configured to receive via Bluetooth wireless communication.

* * * * *